(12) United States Patent
Vanderzee

(10) Patent No.: US 7,421,896 B2
(45) Date of Patent: Sep. 9, 2008

(54) VARIABLE FREQUENCY CHARGE PUMP IN CAPACITIVE LEVEL SENSOR

(75) Inventor: Joel C. Vanderzee, La Crosse, WI (US)

(73) Assignee: Trane International Inc., Piscataway, NJ (US)

( * ) Notice: Subject to any disclaimer, the term of this patent is extended or adjusted under 35 U.S.C. 154(b) by 343 days.

(21) Appl. No.: 11/293,620

(22) Filed: Dec. 2, 2005

(65) Prior Publication Data

US 2007/0125172 A1    Jun. 7, 2007

(51) Int. Cl.
G01F 23/26    (2006.01)

(52) U.S. Cl. ...................................... 73/304 C

(58) Field of Classification Search ............... 73/304 C, 73/290 R
See application file for complete search history.

(56) References Cited

U.S. PATENT DOCUMENTS

| | | | |
|---|---|---|---|
| 4,199,984 A * | 4/1980 | Huddart et al. ........... 73/304 C |
| 4,392,378 A * | 7/1983 | Pitches et al. ............. 73/304 C |
| 5,031,068 A | 7/1991 | Hansen, III et al. |
| 5,042,299 A * | 8/1991 | Wells ........................ 73/304 C |
| 5,097,703 A * | 3/1992 | Peter ......................... 73/304 C |
| 6,362,632 B1 | 3/2002 | Livingston |
| 6,472,887 B1 * | 10/2002 | Tullis et al. .................. 324/663 |
| 6,539,797 B2 | 4/2003 | Livingston et al. |
| 6,578,416 B1 * | 6/2003 | Vogel et al. ............... 73/304 C |

* cited by examiner

Primary Examiner—Hezron E. Williams
Assistant Examiner—Rodney T Frank
(74) Attorney, Agent, or Firm—William O'Driscoll

(57) ABSTRACT

A method of determining a fluid or material level. The method comprises the steps of: providing, at a first frequency, a current operatively capable of changing a capacitor; charging at least first and second capacitive devices to a predetermined voltage using the provided current; measuring the amount of current respectively necessary to charge the first and second capacitive devices to the predetermined voltage; determining a liquid level based on the measured signals from charging the first and second capacitive devices; and varying the first frequency.

14 Claims, 2 Drawing Sheets

VARIABLE FREQUENCY CHARGE PUMP IN CAPACITIVE LEVEL SENSOR

FIELD OF THE INVENTION

The present invention generally relates to capacitive level sensors used to determine the presence or level of an object, fluid or materials. In one specific application, the level of liquid refrigerant in a sump or heat exchanger is determined by varying the frequency that a capacitive level sensor is charged at.

BACKGROUND OF THE INVENTION

Capacitive sensors are used extensively for level measurement and proximity detection. A capacitive sensor, which includes one or more conductive plates, is sensitive to changes in the dielectric constant of material or fluid near or surrounding the plates. The capacitive sensor detects the presence or lack of material in the vicinity of the plates by measuring the capacitance between the plates.

An improved capacitance level sensor is shown in U.S. Pat. No. 6,539,797 to Livingston et al., which describes a charge pump circuit designed to measure the amount of current required to charge the electrodes of a sensor array to a predetermined voltage. A related patent, U.S. Pat. No. 6,362,632 to Livingston, describes a sensor circuit for measuring the capacitance of a sensor element in the charge pump circuit of the Livingston et al. patent. In these Livingston patents, the sensor level includes a sensor array disposed in a reservoir along an axis of measurement of the fluid or material. The sensor array includes a plurality of electrodes, wherein the capacitance of each of the electrodes varies in accordance with both the extent of the arrays immersion into the fluid or material and the dielectric constant of the fluid or the material. The plurality of electrodes includes a lower electrode adapted to be immersed within the fluid or material in the reservoir and whose capacitance provides an estimate of the dielectric constant of the fluid or material contained within the reservoir, and a middle electrode whose capacitance varies from a calibrated initial value to a value that is dependent on the level of and the dielectric constant of the fluid or material contained within the reservoir as determined from the capacitance of the lower electrode. This level sensor further includes a circuit capable of measuring the current required to repetitively charge each reference electrode to a predetermined voltage and converting each current to a digitized sensor voltage representing the capacitance of each electrode. A microprocessor then receives and processes the digitized sensor voltage to determine the fluid or material level such that the fluid or material level is determined from the capacitance of the middle electrode and is compensated by the amount or rate of change of the capacitance of the lower electrode.

In one example of a capacitance level sensor such as shown in the Livingston patents, one application of such a capacitive level sensor is a refrigerant level sensor which typically incorporates a sensor having a first pair of conductors positioned in a sump or heat exchanger in a lower region and a second pair of conductors positioned above the first pair of conductors. As the liquid refrigerant level rises, the ratio of capacitance determined by the second pair of conductors versus the first pair of conductors provides a direct correlation to the liquid level present in the heat exchanger or the sump.

In such an application, it has been found that the charge pump circuit of the Livingston patents operates correctly as long as operation occurs within a predetermined capacitance range. However, the charge pump sensor of the Livingston patents has an inherent limitation of operating within a predetermined capacitance range as determined in column 7, lines 14-18 of U.S. Pat. No. 6,362,362 to Livingston and by formula (7) in column 7 of U.S. Pat. No. 6,539,797 to Livingston et al. If that predetermined capacitive range is exceeded, such as may occur when measuring fluids having a high dielectric constant, a lack of functionality results. On the other hand, use of the charge pump of the Livingston patent with fluids of a low dielectric constant may result in resolution issues since only a small portion of the predetermined capacitive range is used. Moreover, the reference electrodes must be protected from corrosive effects of the fluid being measured and are therefore generally protected from that fluid by a circuit board having varying layers of physical protection and varying dielectrics. Consequently, the value K in formula (7) of Livingston et al can only function accurately at a fixed fluid dielectric because the capacitance varies in a non-linear manner across this circuit board and across a fluid having different dielectrics.

There is a need, therefore, for a charge pump sensor that is capable of adapting to a wide range of dielectric constants in the fluid or material being sensed. The preferred sensor would be capable of providing high resolution when measuring fluids of low dielectric constant and of providing increased range when fluids or materials with a high dielectric constant are to be sensed.

SUMMARY OF THE INVENTION

The present invention overcomes the difficulties and issues in the previous capacitance level sensors.

The present invention provides a method of determining a fluid level. The method comprises the steps of: providing, at a first frequency, a current operatively capable of changing a capacitor; charging at least first and second capacitive devices of a capacitive sensor array to a predetermined voltage using the provided current; measuring the amount of current respectively necessary to charge the first and second capacitive devices to the predetermined voltage; determining a liquid level based on a ratio of the measured capacitance from charging the first and second capacitive devices; and varying the first frequency.

The present invention also provides a fluid level determining apparatus. The apparatus comprises a charge pump operatively capable of providing a capacitor charging current; a capacitive sensor array having at least first and second capacitive devices; and hardware or software for charging the first and second capacitive devices of the sensor array to a predetermined voltage using the capacitor charging current. The apparatus also comprises hardware or software for measuring the amount of current respectively necessary to charge the first and second capacitive devices to the predetermined voltage; hardware or software for determining a liquid level based on a ratio of the measured capacitance from the first and second capacitive device; and hardware or software for varying the frequency of the capacitor charging current.

The present invention further provides a capacitive level sensor for measuring the level of fluid or material contained within a reservoir. The sensor comprises a capacitive sensor array adapted to be disposed in a reservoir along an axis of measurement of the material or fluid contained within the reservoir, a circuit, a microprocessor and a charge pump. The sensor array comprises first and second electrodes wherein the capacitance of each of the first and second electrodes varies in accordance with both the extent of the arrays immersion in the fluid or material and the dielectric constant of the fluid or material. The first electrode is adapted to be positioned near the bottom of the reservoir and has a capacitance which provides an estimate of a dielectric constant of the fluid or material contained within the reservoir. The second electrode extends along the length of the array and has a capacitance which varies from a calibrated initial value to a value that is dependent on the level of and the dielectric constant of the fluid or material contained within the reservoir as determined from the capacitance of the lower electrode. The circuit is capable of measuring the current of each electrode and generating a digitized sensor voltage representing the current of each electrode. The microprocessor receives and processes the digitized sensor voltages to determine the fluid or material level, wherein the level is determined as a function of the capacitance of the second electrode and the capacitance of the first electrode. The charge pump, operatively connected to and controlled by the microprocessor, is also operatively connected to the capacitor sensor array so as to provide a current to the capacitive sensor array under control of the microprocessor. The microprocessor varies the frequency that the current is provided from the charge pump to the capacitive sensor array.

The present invention additionally provides a method for calculating the level of fluid or material. The method comprises the steps of providing a current charging signal at a first frequency to a first capacitive device; measuring a first current needed to charge the first capacitive device; providing a current charging signal at the first frequency to a second capacitive device; measuring a second current needed to charge the second capacitive device; converting the first and second current measurements to respective capacitance measurements; determining a fluid or material level as a function of the first and second measured capacitances; and varying the first frequency of current provided in the providing steps to a second different frequency.

BRIEF DESCRIPTION OF THE DRAWINGS

These and other features, aspects, and advantages of the present invention will be better understood with regard to the following description, appended claims and accompanying drawings wherein:

These drawings are provided for illustrative purposes only and should not be used to unduly limit the scope of the present invention.

DETAILED DESCRIPTION OF THE INVENTION

Figure 1:
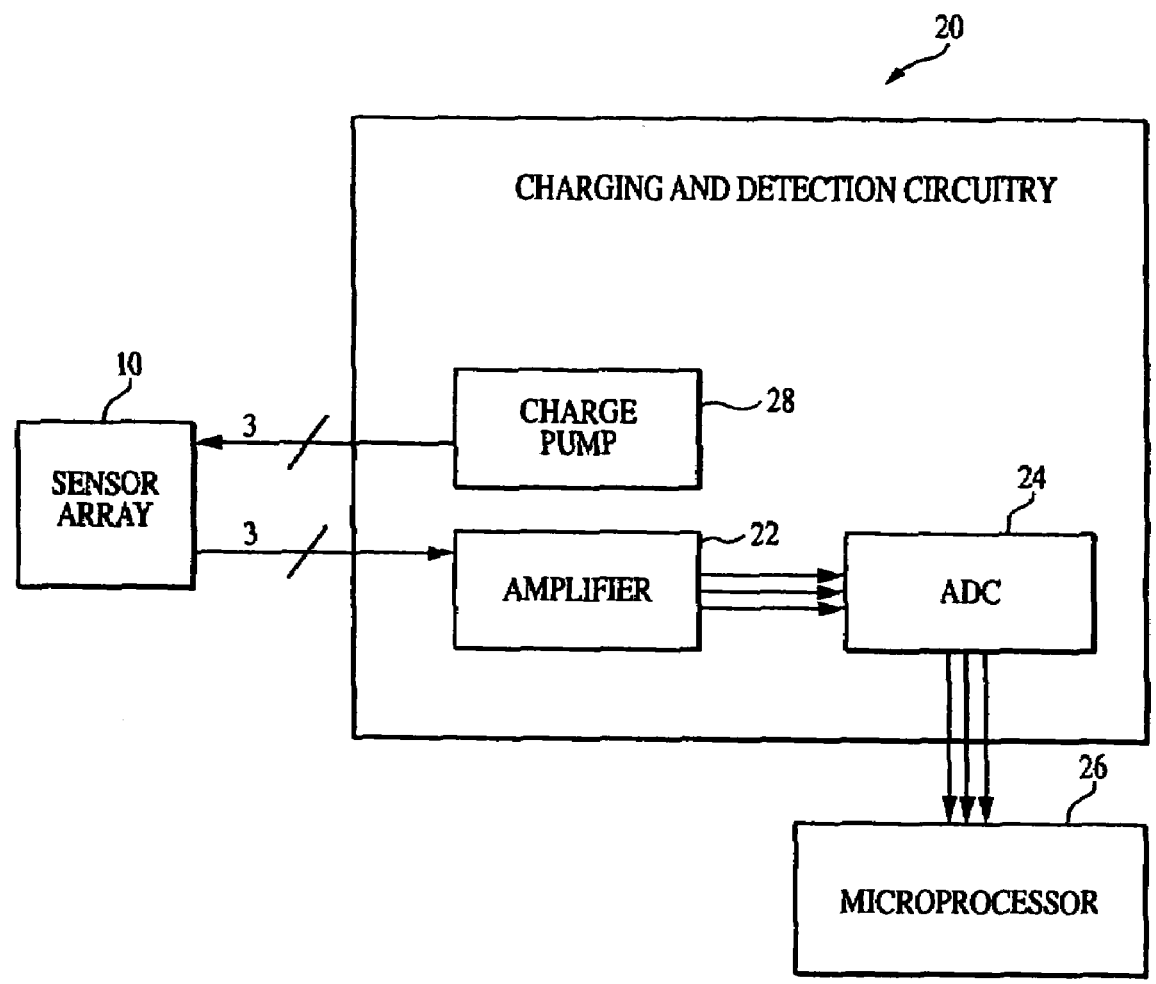
FIG. 1 is a block diagram of a prior art capacitive level sensor.

In Prior Art FIG. 1, a sensor array 10 is incorporated into a capacitive level sensor 20 and includes a circuit capable of measuring the current required to repetitively charge each electrode of the sensor array 10 to a predetermined voltage and converting each current to a digitized sensor voltage representing the capacitance of each electrode. One embodiment of such a capacitive level sensor is disclosed in U.S. Pat. No. 6,539,797 to Livingston et al., entitled "Auto-Compensating Capacitive Level Sensor" (incorporated herein by reference) as is illustrated in FIG. 4 of that patent (included herein as Prior Art FIG. 1). Although many forms of charge pump circuitry may be used, one implementation is disclosed in U.S. Pat. No. 6,362,632 to Livingston, entitled "Balanced Charge Pump Capacitive Material Sensor" (incorporated by reference herein) which is designed to automatically compensate for expected variations in the voltages commonly used in conventional switch capacitor charge pump capacitive sensor assemblies.

Figure 2:
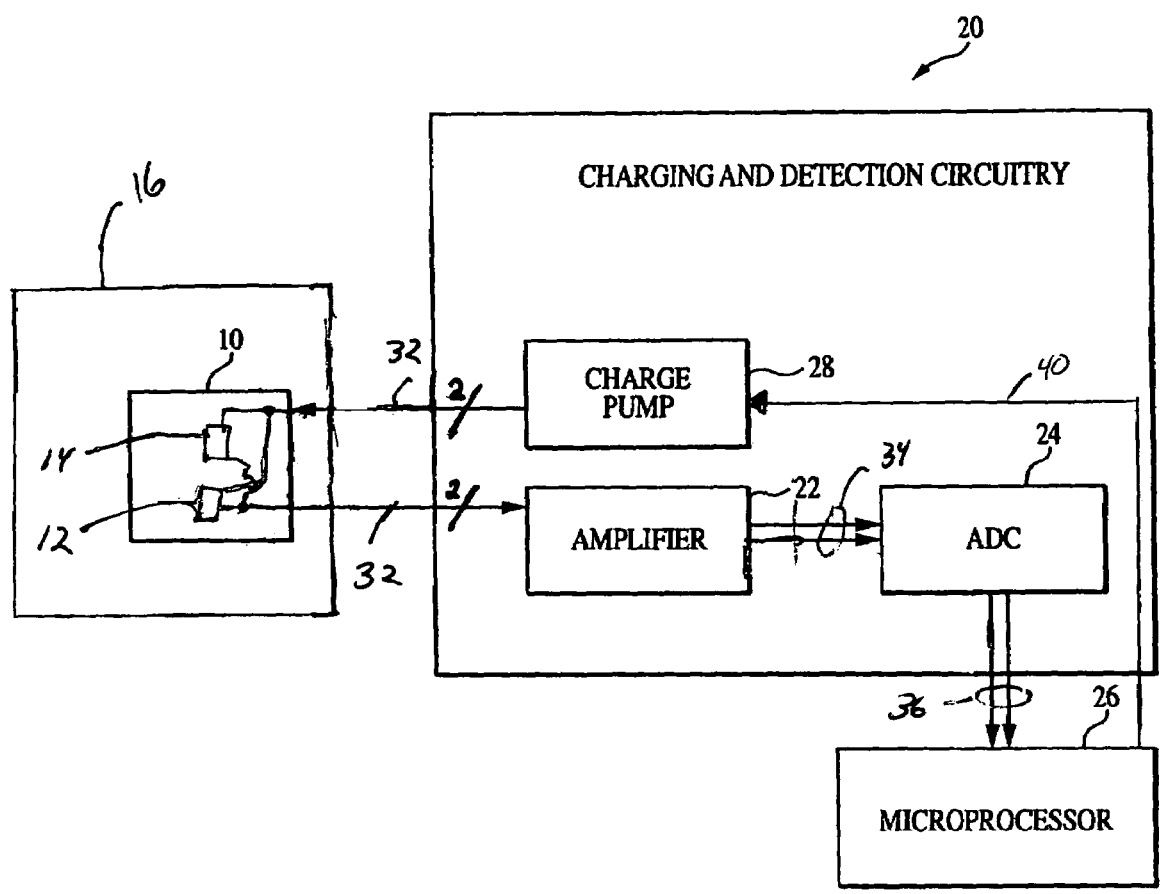
FIG. 2 is a block diagram of a capacitive level sensor in accordance with the present invention.

As shown in FIGS. 1 and 2, each of the electrodes of the sensor array 10 are coupled to a charging and detection circuit 30 designed to measure the amount of current required to charge each of the electrodes of the sensor array 10 to a predetermined voltage. The predetermined voltage is established as a function of the various components used in the circuit 30. The charging and detection circuit 30 includes a charge pump circuit 28. The current from each of the sensor electrodes is fed into a transimpedance amplifier 22 and converted to a voltage, which is then delivered to an analog to digital converter 24. The analog to digital converter 24 converts the analog voltage signals associated with each electrode to a digital signal. The digital signals are then coupled to a digital computer or microprocessor 26 adapted to calculate the level of fluid or material within a reservoir 16 based on the analog to digital signals from each of the electrodes. This reservoir 16 may be a sump, an accumulator, a tank, a heat exchanger, or any other device or container where fluids or materials may be measured.

As shown in FIG. 2, the present invention is an improvement upon the capacitive level sensor 20 of the Livingston patents. For the sake of consistency, similar reference numerals are used in the present application as with the Livingston patents although the preferred embodiment is preferably applied to a refrigerant level sensor which includes two capacitive devices, such as two electrodes 12, 14, rather than the three electrodes identified in connection with the Prior Art FIG. 1 of the Livingston patents. Consequently, only two lines 32 connect the charge pump 28 to the sensor array 10 and in turn connect the sensor array 10 to the amplifier 22. Additionally, two signals are provided from the amplifier 22 by lines 34 to the analog to digital converter 24. The analog to digital converter 24 then provides two signals to the microprocessor 26 by means of lines 36. Clearly, a single line or bus could replace these pairs of lines, or 3 or more lines could be provided if a corresponding number of electrodes were to be used.

In the present invention, a control line or bus 40 connects the microprocessor 26 to the charge pump 28 and allows the microprocessor 26 to turn the charge pump 28 on and off and send a current charging signal of control pulses to the array 10 at a frequency F. In the Livingston patents, this frequency F is fixed and presents the inherent limitation identified in the Background Section of this application. The present invention improves upon the arrangement of the Livingston patents by varying the frequency F to optimize the capacitive range sensed by the sensor array 10. Slowing down the frequency allows measurement as the capacitance increases while increasing frequency provides better resolution measurement of smaller capacitances. Essentially, control pulses are sent at a lower rate when capacitive charge approaches the upper range currently in use such as occurs with fluids of a high dielectric constant. As charge moves away from the upper limit of the range presently in use, the frequency of pulses is increased to increase resolution such as might be useful in connection with a fluid having a low dielectric constant. In essence, the frequency of pulses is varied as a function of the dielectric constant of the fluid or material being measured.

The operation of the capacitive level sensor 20 is as follows: The microprocessor 26 issues a signal on the control line 40 to the charge pump 28 at some frequency F. The charge pump 28 sends a current charging signal on line 32 to a first electrode 12, 14 in the sensor array 10 and the amplifier 22 measures the amount of current required to charge the particular electrode 12, 14 to a predetermined voltage. The measured analog signal is converted from an analog signal to a measured digital signal by the analog to digital converter 24 and provided to the microprocessor 26. Current is calculated as a difference between a calibrated offset voltage and the measured digital signal to provide a calculated current signal.

The calibrated offset voltage corresponds to zero current and zero capacitance, possibly as extrapolated outside of the actual measurement range. From the calculated current signal, a capacitance representative of the capacitance at the first electrode 12, 14 is determined. Essentially, this capacitance is determined by dividing the calculated current signal by the frequency used to charge the first electrode 12, 14.

Periodically, the microprocessor 26 issues a command to the charge pump 28 to switch the current charging signal to the second electrode 12, 14 in the sensor array 10 whereupon the charge pump 28 begins providing a current charging signal to the second electrode 12, 14. The amplifier 22 proceeds to measure the amount of current required to charge the second electrode 12, 14 to a predetermined voltage. The amplifier 22 then provides this second measured electrode signal through the analog to digital converter 24 to the microprocessor 26. Current is calculated as a difference between a calibrated offset voltage and the measured digital signal to provide a calculated current signal. The calibrated offset voltage corresponds to zero current and zero capacitance, possibly as extrapolated outside of the actual measurement range. From the calculated current signal, a capacitance representative of the capacitance at the second electrode 12, 14 is determined. Essentially, this capacitance is determined by dividing the calculated current signal by the frequency used to charge the first electrode 12, 14. In the preferred embodiment, the frequencies charging the first and second electrodes are the same. However, there is a good reason to use different frequencies on the first and second electrodes 12, 14. Using a higher frequency on the lower electrode allows a physically smaller lower electrode which reduces cost and permits the sensed level to be closer to the bottom of the sensor array (because the level is measured in the upper electrode, which is displaced from the bottom by the lower electrode).

In the microprocessor, the signal from the first electrode (typically the lower electrode 12) provides a capacitance $C_L$ which is used as a denominator and the signal from the second electrode (typically the higher electrode 14) provides a capacitance $C_U$ which is used as a numerator to enable a ratio to be calculated according to the formula:

$$R = \frac{C_U - C_{UC}}{C_L - C_{LC}} \quad (1)$$

Where R is the ratio, $C_U$ is the capacitance of the upper electrode 14, $C_L$ is the capacitance of the lower electrode 12, $C_{UC}$ is the capacitance of the upper electrode 14 in the calibration state and $C_{LC}$ is the capacitance of the lower electrode 12 in the calibration state. Calibration state is empty of fluid, i.e. the relative dielectric is 1.

The ratio is correlated to determine liquid level such that the largest ratio is equivalent to the maximum liquid level and the lowest ratio is equivalent to the minimum liquid level. Clearly this ratio arrangement could be inverted by reversing the numerator and denominator and still used in accordance with the present invention by a person of ordinary skill.

Where the non-linear effects of the varying dielectrics of a protective circuit board and fluid (or other equivalent capacitive effects) must be addressed, the non-linear effects can be reduced to a linear solution such that fluid level corresponds to the formula:

$$L - L_O = [K_1 + K_2(C_L - C_{LC})] \cdot R \quad (2)$$

Where $K_1 + K_2$ are empirically determined constants based upon the particular sensor design and $L_0$ is the minimum fluid level. Alternatively, $K_1$ and $K_2$ can be calculated from design parameters.

When the actual digital signal received from the second electrode 14 begins to approach the upper current limit of its actual measurement range (typically zero when using an inverted five volt range), the microprocessor 26 changes the frequency of the signal issued on the control line 40 from a frequency F to a lower frequency H. The charge pump 28 then provides current charging signals to the sensor array 10 at a lower rate corresponding to the frequency H. On the other hand, if the digital signal received from the second electrode 14 begins to approach the lower current limit of its actual measurement range (typically five volts when using an inverted five volt range), the microprocessor 26 changes the frequency of the signals issued on the control line 40 from a frequency F to a higher frequency J. The charge pump then provides the current charging signals to the sensor array 10 at a higher rate corresponding to the frequency J. In either case, the amount of current required to respectively charge the first and second electrodes is again measured, converted to digital signals and provided to the microprocessor 26. The microprocessor 26 then determines liquid level from the new capacitance ratio.

Preferably the new frequencies are chosen so that the signal will fall within the allowed upper and lower limits at some frequency for any current within the expected range of operation. If sufficiently many frequencies are used, then the upper and lower limits can be set so that the amplifier 22 operates in a small voltage range to improve the accuracy in the presence of component variation. Additionally, distinct limits may be determined for each frequency to be used. In essence, the frequency is inversely proportional to the range being measured. Increasing the frequency narrows the range being measured while decreasing the frequency increases the range being measured.

Ranges may be determined for each frequency to be used and stored in a table format so that particular maximum and minimum limits will be known based on the frequency being commanded by the microprocessor 26.

The capacitive level sensor described herein can automatically and optimally adjust for a wide variety of dielectric constants in fluids or materials being sensed.

Although the present invention has been described in considerable detail with reference to preferred embodiments, other embodiments are contemplated without departing from the spirit and scope of the present invention. Therefore the appended claims should not be limited to the description of the preferred embodiments contained herein.

What is desired to be secured for Letters Patent of the United States is set forth as follows:

1. A method of determining a fluid or material level comprising the steps of:
    providing, at a first frequency, a current operatively capable of charging a capacitor;
    charging at least first and second capacitive devices to a predetermined voltage using the provided current;
    measuring the amount of current respectively necessary to charge the first and second capacitive devices to the predetermined voltage, wherein the current is measured over a measurement range having an upper limit and a lower limit;
    determining a liquid level as a function of the measured signals from charging the first and second capacitive devices; and
    varying the first frequency, wherein the first frequency is varied in proportion to the measured current's proximity to one of the upper limit and the lower limit.

2. The method of claim 1 wherein the providing, charging, measuring and determining steps are repeated after the varying step.

3. The method of claim 2 including the further step of calculating a liquid level from the measured signals.

4. The method of claim 1 including the further steps of:
implementing the first and second capacitive devices as first and second electrodes respectively in a capacitive sensor array;
alternately providing a current to the first and second electrodes;
positioning the capacitive sensor array within a reservoir such that the first electrode is submersed in the fluid or material with the fluid or material being in contact with the second electrode, and the capacitance of each of the capacitive devices varies in accordance with both the extent of the capacitive device's immersion in the fluid or material and the dielectric constant of the fluid or materials;
measuring a capacitance of each electrode and generating a digitized sensor voltage representing the capacitance of each electrode;
calculating the level of fluid or material within the reservoir as a function of the capacitance of the second electrode and the capacitance of the first electrode; and
varying the, frequency of the charge provided to the first and second electrodes.

5. The method of claim 1 including the further step of calculating a liquid level from the measured signals.

6. The method of claim 4 Therein the calculating step includes the step of calculating a ratio of the capacitance of the second electrode to the capacitance of the first electrode.

7. A fluid level determining apparatus comprising:
a charge pump operatively capable of providing a capacitor charging current;
a capacitive sensor array having at least first and second capacitive devices;
means for charging the first and second capacitive devices of the sensor array to a predetermined voltage using the capacitor charging current;
means for measuring the amount of current respectively necessary to charge the first and second capacitive devices to the predetermined voltage, wherein the current is measured over a range;
means for determining a liquid level based on the measured signals from the first and second capacitive devices; and
means for varying the frequency of the capacitor charging current, wherein the frequency is varied as a function of the measured current's proximity to an upper or lower limit of the range.

8. The apparatus of claim 7 including means for calculating a liquid level from the measured signals.

9. The apparatus of claim 8 wherein the first and second capacitive devices are respectively implemented as first and second electrodes and wherein the first electrode is located in a reservoir and the second electrode is located in the reservoir above the first electrode.

10. A capacitive level sensor for measuring the level of fluid or material contained within a reservoir comprising:
a capacitive sensor array adapted to be disposed in a reservoir along an axis of measurement of the material or fluid contained within the reservoir, the sensor array comprising first and second electrodes wherein the capacitance of each of the first and second electrodes varies in accordance with both the extent of the arrays immersion in the fluid or material and the dielectric constant of the fluid or material, wherein the first electrode is adapted to be positioned near a bottom of the reservoir and has a capacitance which provides an estimate of a dielectric or constant of the fluid or material contained within the reservoir, and the second electrode extends along the length of the array and has a capacitance which varies from a calibrated initial value to a value that is dependent on the level of and the dielectric constant of the fluid or material contained within the reservoir as determined from the capacitance of the lower electrode;
a circuit capable of measuring the capacitance of each electrode;
a microprocessor for receiving and processing the digitized sensor voltages to determine the fluid or material level, wherein the level is determined as a function of the capacitance of the second electrode and the capacitance of the first electrode; and
a charge pump, operatively connected to and controlled by the microprocessor, and operatively connected to the capacitor sensor array so as to provide a current to the capacitive sensor array under control of the microprocessor, wherein the current is measured over a range having an upper and lower limit;
wherein the microprocessor varies the frequency that the current is provided from the charge pump to the capacitive sensor array, wherein the frequency is varied in proportion to the proximity of digitized sensor voltage of one electrode to the upper or lower limit.

11. The sensor of claim 10 wherein the frequency is also varied as a function of the fluid's dielectric constant.

12. A method of determining a fluid or material level comprising the steps of:
providing a current charging signal at a first frequency to a first capacitive device;
measuring a first current needed to charge the first capacitive device;
providing a current charging signal at the first frequency to a second capacitive device;
measuring a second current needed to charge the second capacitive device;
converting the first and second current measurements to respective capacitance measurements;
determining a fluid or material level as a function of the first and second measured capacitances; and
varying the first frequency of current provided in the providing steps to a second different frequency, wherein the second frequency is lower than the first frequency when an upper current limit of an actual measurement range is approached, and second frequency is higher than the first frequency when a lower current limit of an actual measurement range is approached.

13. The method of claim 12 wherein the determining step includes calculating a ratio of the first measured capacitance to the second measured capacitance.

14. The method of claim 12 wherein the first and second capacitive devices are implemented as first and second electrodes respectively and wherein the first electrode is located in a bottom of a reservoir and the second electrode is above the first electrode and in the reservoir.

* * * * *

UNITED STATES PATENT AND TRADEMARK OFFICE
CERTIFICATE OF CORRECTION

PATENT NO. : 7,421,896 B2  Page 1 of 1
APPLICATION NO. : 11/293620
DATED : September 9, 2008
INVENTOR(S) : Joel C. VanderZee It is certified that error appears in the above-identified patent and that said Letters Patent is hereby corrected as shown below:

Claim 6, Column 7, Line 27, "Therein" should read --wherein--.

Signed and Sealed this

Seventeenth Day of February, 2009

JOHN DOLL
*Acting Director of the United States Patent and Trademark Office*